United States Patent
Shaw

[15] 3,694,521
[45] Sept. 26, 1972

[54] CHLOROSULFONATED BLOCK COPOLYMERS

[72] Inventor: Alfred W. Shaw, Moraga, Calif. 94556

[73] Assignee: Shell Oil Company, New York, N.Y.

[22] Filed: July 31, 1970

[21] Appl. No.: 60,145

[52] U.S. Cl. ..........260/878 B, 260/79.3 R, 260/879, 260/880 B
[51] Int. Cl. ..........................C08f 19/04, C08f 19/08
[58] Field of Search ..........260/878 B, 880 B, 79.3 R

[56] References Cited

UNITED STATES PATENTS 3,607,979    9/1971    Winkler ................260/878 B

Primary Examiner—Joseph L. Schofer
Assistant Examiner—A. Holler
Attorney—Martin S. Baer and William H. Myers

[57] ABSTRACT

Block copolymers are provided which have the properties of a vulcanized polymer without chemical crosslinking. These block copolymers comprise chlorosulfonated derivatives of block polymers having alternate monovinyl arene polymer blocks and chlorosulfonated polymer blocks of the group consisting of polyethylene and hydrogenated polybutadiene.

6 Claims, No Drawings

CHLOROSULFONATED BLOCK COPOLYMERS

BACKGROUND OF THE INVENTION

A large number of polymers have been studied which have the general structure of block copolymers. A substantial number of derivatives of the basic polymers have been synthesized primarily for the purpose of creating terminal polar reactive sites useful for coupling or crosslinking. Special classes of these block copolymers have been found which are referred to as "-self-vulcanizing" block copolymers in that they exhibit the stress-strain properties of vulcanized polymers without having been subjected to any chemical crosslinking operations. The typical block copolymer of this type has the structure polystyrene-polyisoprene-polystyrene. Within certain limitations these are elastomeric but as the polystyrene proportion increases the properties gradually become those of a thermoplastic polymer.

A number of chlorosulfonated polymers have been synthesized, primarily the chlorosulfonation products of polyethylene. These are especially useful as highly stable textile coatings but may be used in electrical applications, building products and the like. However, in order to be useful for most end purposes it is necessary to vulcanize these chlorosulfonated polyethylenes with such vulcanizing agents as magnesium oxide and the like. This entails an extra step in their preparation which adds to their cost and actually excludes them from certain end uses where the vulcanizing must be done in situ but the end use will not tolerate this particular process.

It is an object of the present invention to provide improved block copolymers. It is a particular object of the invention to provide oil resistant and age resistant block copolymers which do not require vulcanization. It is a further object of the invention to provide materials suitable for use in compositions intended for water purification processes and the like. Other objects will become apparent during the following detailed description of the invention.

STATEMENT OF THE INVENTION

Now, in accordance with the present invention chlorosulfonated block copolymers are provided comprising alternate blocks of monovinyl arene polymer blocks and chlorosulfonated polymer blocks of the group consisting of polyethylene blocks and polybutadiene blocks. Preferably, the chlorosulfonated polymer blocks have a sulfur content in the order of 0.5–10 percent and a chlorine content between about 5 and 35 percent both by weight. Still in accordance with this invention, it has been found that the chlorosulfonated polymers of this particular type have highly desirable properties relative to oil resistance, flame resistance, ozone resistance, and age resistance, indicating their utility in situations capitalizing upon these improved properties. Moreover, it has been found that these chlorosulfonated polymers do not require vulcanization in order to attain and retain the stress-strain properties which are found to be especially desirable.

The block copolymers of the present invention are derived by chlorosulfonation of several types of precursor block copolymer. In all of these alternate polymer blocks are monovinyl arene polymer blocks such as those of styrene, alpha-methyl styrene, or ring alkylated styrenes. The alternate blocks copolymerized with these are either hydrogenated polybutadiene or polyethylene blocks. It is particularly contemplated that the polybutadiene blocks have no more than about 30 percent 1,2-content so as to closely resemble polyethylene when hydrogenated to an extent of at least about 70 percent of its olefinic linkages. Thus the block copolymers of this invention prior to chlorosulfonation are essentially "non-elastomeric" since each of the polymer blocks contained therein has glass transition temperature substantially above room temperature. The precursor block copolymers may be either linear or branched, i.e., "star-shaped," "radial," etc. They may be formed by coupling reactions or by sequential block copolymerization. Preferably the monovinyl arene polymer blocks have average molecular weights between about 10,000 and 25,000 and the chlorosulfonated polymer blocks have average molecular weights prior to chlorosulfonation in the order of 40,000 to 150,000. The simplest structure contemplated has the general configuration A-B-A. However, the general structure of multi-block linear configuration is A-(-B-A)$_n$, while the general contemplated branched structure may be represented by the general configuration A-B-(-B-A)$_n$. In the above configurations wherever adjacent blocks are represented by the same letter, e.g., B, these immediately adjacent blocks are regarded as a single block insofar as molecular weights are concerned and insofar as alternate blocks are concerned. In the above general configurations the subscript n represents an integer usually between 1 and 5. Two particularly contemplated basic configurations therefore comprise in their simplest representation polystyrene-polyethylene-polystyrene or polystyrene-hydrogenated polybutadiene-polystyrene.

The preparation of the block copolymers which are used to form the chlorosulfonated derivatives does not form a part of the present invention. Briefly, however, they may be prepared by several alternative processes such as the solution process utilizing a lithium alkyl initiator or a polylithium hydrocarbyl compound. When employing a lithium alkyl such as lithium butyl, the first stage preferably comprises the polymerization of a monovinyl arene to form a first living monovinyl arene polymer block. Subsequently and without removing the lithium ion associated with the living polymer block, butadiene is injected into the system preferably in the absence of any polar compounds so as to maintain as high a cis 1,4-structure as possible and polymerization continued to form an intermediate living copolymer block generally represented as A-B-Li. Two alternatives then may be chosen for forming the block copolymers of this invention, namely, either coupling the intermediate living block copolymer or block polymerizing sequentially a second block of a monovinyl arene. In the latter case a linear polymer would be formed. When a coupling reaction is employed, the choice then exists of selection of the functionality of the coupling agent to result in either a linear block copolymer or one having a branched configuration. If a difunctional coupling agent, such as a dihaloalkane or alkene is employed, then the product will have the structure strongly resembling the sequentially produced linear polymer. However, if poly-functional coupling agents are utilized such as silicon tetrachloride or a diester of a dicarboxylic acid and a monohydric alcohol, e.g., diethyl adipate, then non-linear structures are obtained.

Subsequent to the formation of the precursor block copolymer, it is subjected to hydrogenation insofar as the center block is concerned and only if the center block is butadiene. One of the requirements for hydrogenation of an unsaturated butadiene polymer block is to reduce its sensitivity insofar as the olefinic linkages are concerned which are apt to rupture during the chlorosulfonation step. The hydrogenation of the butadiene polymer block results in what may be regarded as essentially a polyethylene block particularly if hydrogenation is carried to an extent of reducing at least about 70 percent of the olefinic unsaturation originally present in this block. If the olefinic block comprises polyethylene, no hydrogenation, of course, is necessary. Chlorosulfonation of the olefinic block, i.e., either polyethylene or hydrogenated polybutadiene, is selective since monovinyl arene polymer blocks appear to be largely insensitive to the usual conditions of chlorosulfonation. Two general methods may be employed. One involves the use of sulfur dioxide and chlorine in the presence of light or a free radical source, while the other utilizes sulfuryl chloride in the presence of light and a small amount of catalyst such as pyridine or quinoline. The first method is preferred if it is desired to introduce large amounts of chlorine with only small amounts of sulfur. The second method is best suited to give reproducible results when a minimum amount of chlorine is desired.

Essentially all of the available chlorine ends up in the polymer when sulfuryl chloride is used as the chlorosulfonating agent. The yield on sulfur varies with the conditions and catalyst. Yields are improved by controlling the temperature preferably between 20° and 30° C, although satisfactory results are obtained at temperatures between about 20° and 60° C. Suitable catalysts comprise diethyl amine, triethyl phosphate, amyl amine, or tributyl phosphine. Solvents preferred for the chlorination include halocarbons, such as carbon tetrachloride or arenes such as benzenes.

The chlorosulfonated products prepared as described above may be utilized without vulcanization or further derivatizing although it is possible and sometimes preferred to saponify the sulfonic acid groups with either amines or alkali metals. The structure of the block copolymer is such that vulcanization is unnecessary since it will assume a suitable set of physical properties created by the "domains" set-up by the monovinyl arene polymer blocks.

The chlorosulfonated polymers may be exposed to an atmosphere of ammonia. They may be converted to esters such as the phenyl esters. Typically this can be done by reacting the chlorosulfonated polymer with phenol in the presence of a solvent such as benzene and a catalyst such as pyridine. Suitable reaction times are 4–48 hours at temperatures between about 20° and 75° C. This results in increased stiffness of the product.

Amides of the chlorosulfonated polymers may be formed by reaction with primary or secondary amines, particularly aliphatic mines. These react nearly quantitatively with chlorosulfonated block copolymers, utilizing a reaction time in the order of 1-24 hours at ambient temperatures; preferably 100 percent or greater molar excess of the amine is employed.

The chlorosulfonated products of this invention have the properties normally associated with thermoplastic polymers as contrasted to elastomeric polymers. They will have glass transition temperatures above room temperature and no glass transition temperature at −50° C or lower such as typical of elastomeric products.

The subject type of chlorosulfonated block copolymers may be used as such or blended with other polymers particularly chlorosulfonated polymer to alter the properties of the latter and to enhance their utility in end uses such as electrical coverings, hoses, belting, sidewalls, building products, fabric coatings, or soling materials. They are particularly outstanding in their flame resistance, oil resistance, ozone resistance and age resistance as well as having a variable amount of hydrophilic properties depending upon the amount of chlorosulfonation which has taken place.

The following example illustrates the preparation of the chlorosufonated products of this invention.

EXAMPLE I

A block copolymer having the structure polystyrene-polybutadiene-polystyrene is formed wherein the block average molecular weights are 15,000–75,000–15,000. The 1,2-content of the polybutadiene block is about 20 percent. This block copolymer is hydrogenated utilizing the reaction of aluminum triethyl and nickel acetate at temperatures in the order of about 30° C so as to selectively hydrogenate completely the polybutadiene block. The hydrogenated polymer then subjected to chlorosulfonation under the following conditions: Block copolymer (25 grams) is dispersed in carbon tetrachloride (925 grams), purged with nitrogen at 60° C for 15 minutes, cooled to 20° C. Thereafter, pyridine (0.2 cc) and sulfuryl chloride (10cc) are added. Chlorosulfonation occurs at 20°–30° C with the aid of ultraviolet light from a 275 watt sunlamp for about 1 hour. Residual gases are then purged from the system with nitrogen at about 50° C. The polymer is coagulated in isopropyl alcohol and dried.

A pressed sample of this polymer has the following typical properties:

| | |
|---|---|
| Tensile strength at Break | >3000 psi |
| Elongation at Break | 300 % |
| Resilience | >60 % |
| Hardness (Shore A) | 55 |

I claim as my invention:

1. A non-elastomeric thermoplastic chlorosulfonated block copolymer, having glass transition temperatures above room temperature and no glass transition temperature below −50° C said copolymer comprising alternate blocks of (a) a monovinyl arene polymer and (b) of a thermoplastic non-elastomeric polymer block of the group consisting of chlorosulfonated polyethylene and chlorosulfonated hydrogenated polybutadiene, the latter block prior to hydrogenation having less than 30 percent 1,2-content said blocks (b) having a sulfur content between about 0.5 percent and 10 percent and a chlorine between about 5 percent and 35 percent by weight.

2. A copolymer according to claim 1 wherein the alternating blocks are polystyrene and chlorosulfonated polyethylene blocks.

3. A copolymer according to claim 1 wherein the alternating blocks are polystyrene and chlorosulfonated hydrogenated polybutadiene blocks.

4. A block copolymer according to claim 1 wherein the blocks (a) have average molecular weights between about 10,000 and 25,000 and the blocks (b) have average molecular weights between about 40,000 and 150,000.

5. A block copolymer according to claim 1 bearing alkali metal-neutralized sulfonic acid radicals.

6. A block copolymer according to claim 1 having the general structure $$A\text{-}B\text{-}(\text{-}B\text{-}A)_n$$

wherein each A is a monovinyl arene polymer block, each B is a chlorosulfonated polymer block and n is an integer from 1 to 5.